(12) United States Patent
Lee

(10) Patent No.: US 12,050,976 B2
(45) Date of Patent: Jul. 30, 2024

(54) CONVOLUTION OPERATIONS UTILIZING NONZERO PADDING DATA COPIED FROM INPUT CHANNEL DATA

(71) Applicant: SAMSUNG ELECTRONICS CO., LTD., Suwon-si (KR)

(72) Inventor: Tammy Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 868 days.

(21) Appl. No.: 16/875,214

(22) Filed: May 15, 2020

(65) Prior Publication Data

US 2020/0364538 A1  Nov. 19, 2020

(30) Foreign Application Priority Data

May 16, 2019 (KR) .................. 10-2019-0057604

(51) Int. Cl.
*G06N 3/04* (2023.01)
(52) U.S. Cl.
CPC ....................... *G06N 3/04* (2013.01)
(58) Field of Classification Search
CPC ........................................................ G06N 3/04
See application file for complete search history.

(56) References Cited

U.S. PATENT DOCUMENTS 10,509,998 B2   12/2019   Chen et al.
10,699,160 B2   6/2020    Lee et al.
2010/0211537 A1*  8/2010  Gepperth ............... G06N 3/10
                                                                  382/156
2018/0137406 A1   5/2018   Howard et al.
2018/0181858 A1   6/2018   Son et al.
2019/0138892 A1   5/2019   Kim et al.
(Continued)

FOREIGN PATENT DOCUMENTS

CN    107844828 A     3/2018
CN    108205700 A     6/2018
KR    1020180073118 A 7/2018
(Continued)

OTHER PUBLICATIONS

Liu et al. Partial Convolution based Padding. Nov. 28, 2018. (Year: 2018).*

(Continued)

*Primary Examiner* — Alexey Shmatov
*Assistant Examiner* — Robert Bejcek, II
(74) *Attorney, Agent, or Firm* — Sughrue Mion, PLLC

(57) ABSTRACT

A method of performing, by an electronic device, a convolution operation at a certain layer in a neural network includes: obtaining N pieces of input channel data; performing a first convolution operation by applying a first input channel data group including K pieces of first input channel data from among the N pieces of input channel data to a first kernel filter group including K first kernel filters; performing a second convolution operation by applying a second input channel data group including K pieces of second input channel data from among the N pieces of input channel data to a second kernel filter group including K second kernel filters; and obtaining output channel data based on the first convolution operation and the second convolution operation, wherein K is a natural number that is less than N.

9 Claims, 11 Drawing Sheets

(56) References Cited

U.S. PATENT DOCUMENTS

2019/0138902 A1 5/2019 Matveev et al.
2019/0188237 A1* 6/2019 Chen ................ G06N 3/063

FOREIGN PATENT DOCUMENTS

KR 1020190022237 A 3/2019
KR 10-2019-0052587 A 5/2019

OTHER PUBLICATIONS

International Search Report (PCT/ISA/210) and Written Opinion (PCT/ISA/237) dated Sep. 1, 2020 issued by the International Searching Authority in International Application No. PCT/KR2020/006434.
Communication dated Mar. 30, 2022 issued by the Korean Intellectual Property Office in KR Application No. 10-2019-0057604.
Zhao et al. "Learning Group Convolution for Efficient Inference", Apr. 6, 2019, arXiv:1811.09341v2 [cs.CV], 10 pages total.
Wang et al. "Fully Learnable Group Convolution for Acceleration of Deep Neural Networks", Mar. 31, 2019, arXiv:1904.00346v1 [cs.CV], pp. 9041-9050 (10 pages total.).
Huang et al., "CondenseNet: An Efficient DenseNet using Learned Group Convolutions", Jun. 18, 2018 IEEE/CVF Conference on Computer Vision and Pattern Recognition, pp. 2752-2761 (10 pages total.).
Zhang et al., "Interleaved Group Convolutions", Oct. 22, 2017 IEEE International Conference on Computer Vision, pp. 4383-4392 (10 pages total.).
Wang et al., "Learning Versatile Filters for Efficient Convolutional Neural Networks", 32nd Conference on Neural Information Processing Systems (NeurIPS 2018), Montreal, Canada, 11 pages total.
Communication dated Apr. 14, 2022 issued by the European Patent Office in EP Application No. 20805100.3.
Zhong et al., "Shift-based Primitives for Efficient Convolutional Neural Networks", Sep. 25, 2018, arXiv:1809.08458v2 [cs.CV], 10 pages total.
Zhang et al., "ShuffleNet: An Extremely Efficient Convolutional Neural Network for Mobile Devices", Dec. 7, 2017, arXiv:1707.01083v2 [cs.CV], 9 pages total.
NumPy community, "NumPy Reference", May 29, 2016, Release 1.11.0, (1538 pages total).
Office Action dated Jun. 4, 2024, issued by European Patent Office in European Patent Application No. 20805100.3.

* cited by examiner

CONVOLUTION OPERATIONS UTILIZING NONZERO PADDING DATA COPIED FROM INPUT CHANNEL DATA

CROSS-REFERENCE TO RELATED APPLICATION(S)

This application is based on and claims priority under 35 U.S.C. § 119 to Korean Patent Application No. 10-2019-0057604, filed on May 16, 2019, in the Korean Intellectual Property Office, the disclosure of which is incorporated by reference herein in its entirety.

BACKGROUND

1. Field

The disclosure relates to a method of performing, by an electronic device, a convolution operation at a certain layer in a neural network, and the electronic device for performing the method, and more particularly, to a method of performing, by an electronic device, a convolution operation at a certain layer in a neural network, and the electronic device for performing the method.

2. Description of Related Art

With the exponential increase in data traffic along with the development of computer technology, artificial intelligence (AI) has become a major trend leading future innovation. Because AI imitates how a human being thinks, it may be infinitely applied to substantially all industries. Representative technologies of AI may include pattern recognition, machine learning, expert system, neural network, natural language processing, and the like.

A neural network models characteristics of human biological neurons by using a mathematical expression and uses an algorithm that imitates the human ability referred to as learning. By using such an algorithm, the neural network may generate mapping between input data and output data, and an ability of generating the mapping may be represented as a learning ability of the neural network. In addition, the neural network has a generalization ability by which correct output data may be generated for input data, which has not been used for training, based on a trained result.

In a convolutional neural network (CNN) and the like, deepening has been performed to obtain high accuracy. However, deepening results in a large increase in a computation amount and a decrease in an inference speed in a low-performance environment. To solve this problem, research on deep learning structures such as MobileNet and ShuffleNet has been attempted.

SUMMARY

The disclosure provides a method of performing, by an electronic device, a convolution operation at a certain layer in a neural network and an electronic device for performing the method, the method including: obtaining N pieces of input channel data; performing a first convolution operation by applying a first input channel data group including K pieces of first input channel data selected from the N pieces of input channel data to a first kernel filter group including K first kernel filters; performing a second convolution operation by applying a second input channel data group including K pieces of second input channel data selected from the N pieces of input channel data to a second kernel filter group including K second kernel filters; and obtaining output channel data based on the first convolution operation and the second convolution operation, thereby exhibiting good performance by reducing an accuracy loss while reducing a computation amount.

Additional aspects will be set forth in part in the description which follows and, in part, will be apparent from the description or may be learned by practice of the presented embodiments.

In accordance with an aspect of the disclosure, a method of performing, by an electronic device, a convolution operation at a certain layer in a neural network includes: obtaining N pieces of input channel data; performing, by the electronic device, a first convolution operation in the neural network by applying a first input channel data group including K pieces of first input channel data, from among the N pieces of input channel data, to a first kernel filter group including K first kernel filters; performing, by the electronic device, a second convolution operation in the neural network by applying a second input channel data group including K pieces second input channel data, from among the N pieces input channel data, to a second kernel filter group including K second kernel filters; and obtaining output channel data based on the first convolution operation and the second convolution operation, wherein N is a natural number and K is a natural number that is less than N.

The N pieces of input channel data may have indices from 0 to N−1; the first input channel data group may include the K pieces of first input channel data corresponding to indices from 0 to K−1; the second input channel data group may include the K pieces of second input channel data corresponding to indices from S to S+K−1; and S may be determined by a preset channel stride.

The K pieces of first input channel data may include pieces of input channel data respectively corresponding to the indices from 0 to K−1; and the K pieces of second input channel data may include pieces of input channel data respectively corresponding to the indices from S to S+K−1.

A number of pieces of output channel data may be determined based on S and K.

The N pieces of input channel data may include a preset number of pieces of padding data.

Among the N pieces of input channel data, pieces of input channel data corresponding to indices from 0 to P−1 and pieces of input channel data corresponding to indices from N−P to N−1 may be pieces of padding data.

The pieces of padding data may be copied from the N pieces of input channel data to be the same as a portion from among pieces of output data computed at a layer before the certain layer.

The N pieces of input channel data may be based on image data processed by the electronic device.

The convolution operation may be performed in a convolutional neural network (CNN).

In accordance with another aspect of the disclosure, an electronic device for performing a convolution operation at a certain layer of a neural network, includes: a memory storing one or more instructions; and a processor configured to execute the one or more instructions stored in the memory to: obtain N pieces of input channel data; perform a first convolution operation in the neural network by applying a first input channel data group including K pieces of first input channel data, from among the N pieces input channel data, to a first kernel filter group including K first kernel filters; perform a second convolution operation in the neural network by applying a second input channel data group including K pieces of second input channel data, from among the N pieces of input channel data, to a second kernel filter group including K second kernel filters; and obtain output channel data based on the first convolution operation and the second convolution operation, wherein N is a natural number and K is a natural number that is less than N.

The N pieces of input channel data may have indices from 0 to N−1; the first input channel data group may include the K pieces of first input channel data corresponding to indices from 0 to K−1; the second input channel data group may include the K pieces of second input channel data corresponding to indices from S to S+K−1; and S may be determined by a preset channel stride.

The K pieces of first input channel data may include pieces of input channel data respectively corresponding to the indices from 0 to K−1; and the K pieces of second input channel data may include pieces of input channel data respectively corresponding to the indices from S to S+K−1.

A number of pieces of output channel data may be determined based on S and K.

The N pieces of input channel data may include a preset number of pieces of padding data.

Among the N pieces of input channel data, pieces of input channel data corresponding to indices from 0 to P−1 and pieces of input channel data corresponding to indices from N−P to N−1 may be pieces of padding data.

The pieces of padding data may be copied from the N pieces of input channel data to be the same as a portion from among pieces of output data computed at a layer before the certain layer.

The N pieces of input channel data may be based on image data processed by the electronic device.

The convolution operation may be performed in a convolutional neural network (CNN).

In accordance with another aspect of the disclosure, a non-transitory computer-readable recording medium has stored therein a program for executing, on an electronic device, a method of performing a convolution operation at a certain layer in a neural network, the method including: obtaining N pieces of input channel data; performing, by the electronic device, a first convolution operation in the neural network by applying a first input channel data group including K pieces of first input channel data, from among the N pieces of input channel data, to a first kernel filter group including K first kernel filters; performing, by the electronic device, a second convolution operation in the neural network by applying a second input channel data group including K pieces second input channel data, from among the N pieces input channel data, to a second kernel filter group including K second kernel filters; and obtaining output channel data based on the first convolution operation and the second convolution operation, wherein N is a natural number and K is a natural number that is less than N.

The N pieces of input channel data may have indices from 0 to N−1; the first input channel data group may include the K pieces of first input channel data corresponding to indices from 0 to K−1; the second input channel data group may include the K pieces of second input channel data corresponding to indices from S to S+K−1; and S may be determined by a preset channel stride.

BRIEF DESCRIPTION OF THE DRAWINGS

The above and other aspects, features and advantages of certain embodiments of the present disclosure will be more apparent from the following description, taken in conjunction with the accompanying drawings, in which.

DETAILED DESCRIPTION

Figure 1:
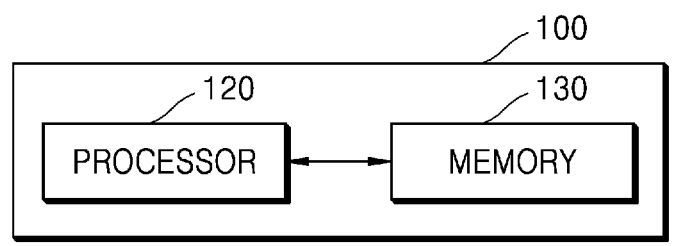
FIG. 1 is a block diagram of an electronic device for performing a convolution operation at a certain layer in a neural network, according to an embodiment.

The terms used in the specification will be schematically described, and then, one or more embodiments will be described in detail.

The terms used in the disclosure are those general terms currently widely used in the art, but the terms may vary according to the intention of one of ordinary skill in the art, precedents, or new technology in the art. Also, specified terms may be selected by the applicant, and in this case, the detailed meaning thereof will be described in or understandable from the detailed description. Thus, the terms used in the disclosure should be understood not as simple names, but based on the meaning of the terms and the overall description.

Throughout the specification, it will also be understood that when a component "includes" an element, unless there is a contrary description thereto, it should be understood that the component does not exclude another element, but may further include another element. In addition, terms such as " . . . unit," " . . . module," and the like refer to units that perform at least one function or operation, and the units may be implemented as hardware or software or as a combination of hardware and software.

Throughout the disclosure, expressions such as "at least one of a, b or c" indicates only a, only b, only c, both a and b, both a and c, both b and c, all of a, b, and c, or variations thereof.

Hereinafter, embodiments of the disclosure will be described in detail with reference to the accompanying drawings so that those of ordinary skill in the art may easily realize the disclosure. However, the disclosure may be embodied in many different forms and should not be construed as being limited to embodiments set forth herein. In the drawings, parts irrelevant to the description may be omitted to clearly describe the disclosure, and like reference numerals denote like elements throughout the specification.

In the specification, "input channel data" indicates data included in an input channel used in a convolution process of a neural network, "padding data" indicates data used as input channel data by copying a portion of channel data output at a previous layer, and "output channel data" indicates data included in an output channel that is a convolution result of a neural network. These types of data may include image data, voice data, and the like.

FIG. 1 is a block diagram of an electronic device 100 for performing a convolution operation at a certain layer in a neural network, according to an embodiment.

Referring to FIG. 1, the electronic device 100 for performing a convolution operation at a certain layer in a neural network, according to an embodiment, may include a processor 120 (e.g., at least one processor) and a memory 130.

The processor 120 may generally control the electronic device 100. Further, the processor 120 may execute one or more programs stored in the memory 130.

The memory 130 may store various data and a program or an application for operating and controlling the electronic device 100. The program stored in the memory 130 may include one or more instructions. The program (e.g., the one or more instructions) or application stored in the memory 130 may be executed by the processor 120.

According to an embodiment, the processor 120 may obtain N pieces of input channel data, perform a first convolution operation by applying a first input channel data group including K pieces of first input channel data selected from the N pieces of input channel data to a first kernel filter group including K first kernel filters, perform a second convolution operation by applying a second input channel data group including K pieces of second input channel data selected from the N pieces of input channel data to a second kernel filter group including K second kernel filters, and obtain output channel data based on the first convolution operation and the second convolution operation.

Figure 2:
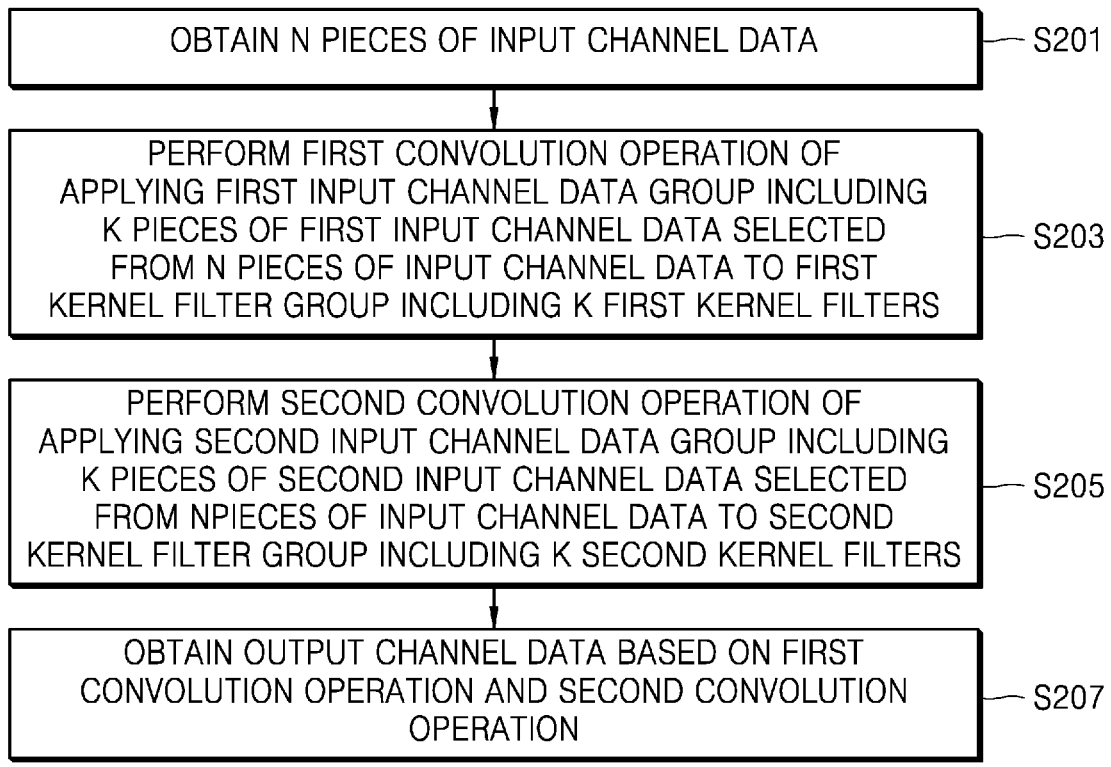
FIG. 2 is a flowchart of a method of performing, by an electronic device, a convolution operation at a certain layer in a neural network, according to an embodiment.

FIG. 2 is a flowchart of a method of performing, by the electronic device 100, a convolution operation at a certain layer in a neural network, according to an embodiment.

Referring to FIG. 2, the processor 120 in the electronic device 100 for performing a convolution operation at a certain layer in a neural network may obtain N pieces of input channel data in operation S201.

For example, the input channel data may be based on image data processed by the electronic device 100.

In operation S203, a first convolution operation may be performed by applying a first input channel data group including K pieces of first input channel data selected from the N pieces of input channel data to a first kernel filter group including K first kernel filters.

In the specification, it is understood that "pieces of first input channel data" do not indicate the same pieces of input channel data but are for distinguishing pieces of input channel data included in the first input channel data group from other pieces of input channel data. Likewise, "pieces of second input channel data" do not indicate the same pieces of input channel data but are for distinguishing pieces of input channel data included in a second input channel data group from other pieces of input channel data. In this regard, the terms "first" and "second" are used for distinguishing purposes, and not for connoting a particular order or hierarchy.

In operation S205, a second convolution operation may be performed by applying the second input channel data group including K pieces of second input channel data selected from the N pieces of input channel data to a second kernel filter group including K second kernel filters. K is a natural number less than N.

The N pieces of input channel data may have indices of 0 to N−1, the first input channel data group may include the pieces of first input channel data corresponding to indices of 0 to K−1, the second input channel data group may include the pieces of second input channel data corresponding to indices of S to S+K−1, and S may be determined by a preset channel stride value.

The pieces of first input channel data may include pieces of input channel data respectively corresponding to the indices of 0 to K−1. Further, the pieces of second input channel data may include pieces of input channel data respectively corresponding to the indices of S to S+K−1

The N pieces of input channel data may include a preset number of pieces of padding data.

The pieces of padding data may be copied from the pieces of input channel data to be the same as a portion selected from pieces of output data computed at a layer before the certain layer.

Among the pieces of input channel data, pieces of input channel data corresponding to indices of 0 to P−1 and pieces of input channel data corresponding to indices of N−P to N−1 may be the pieces of padding data.

In operation S207, pieces of output channel data may be obtained based on the first convolution operation and the second convolution operation.

The convolution operation may be performed in a convolutional neural network (CNN).

The number of pieces of output channel data may be determined based on S and K.

In particular, the number of pieces of output channel data may be determined by mathematical formula 1 below:

$$\text{out\_ch} = (\text{in\_ch} - \text{kernel\_num} + 2*\text{pad})/\text{ch\_stride} + 1$$
[Mathematical formula 1]

where out_ch denotes the number of pieces of output channel data, in_ch denotes the number of pieces of input channel data, kernel_num denotes the number of pieces of input channel data of an input channel data group applied to a kernel filter group, 2*pad denotes the number of pieces of padding data, and ch_stride denotes an index interval of the pieces of input channel data to which the kernel filter group is applied.

Figure 3:
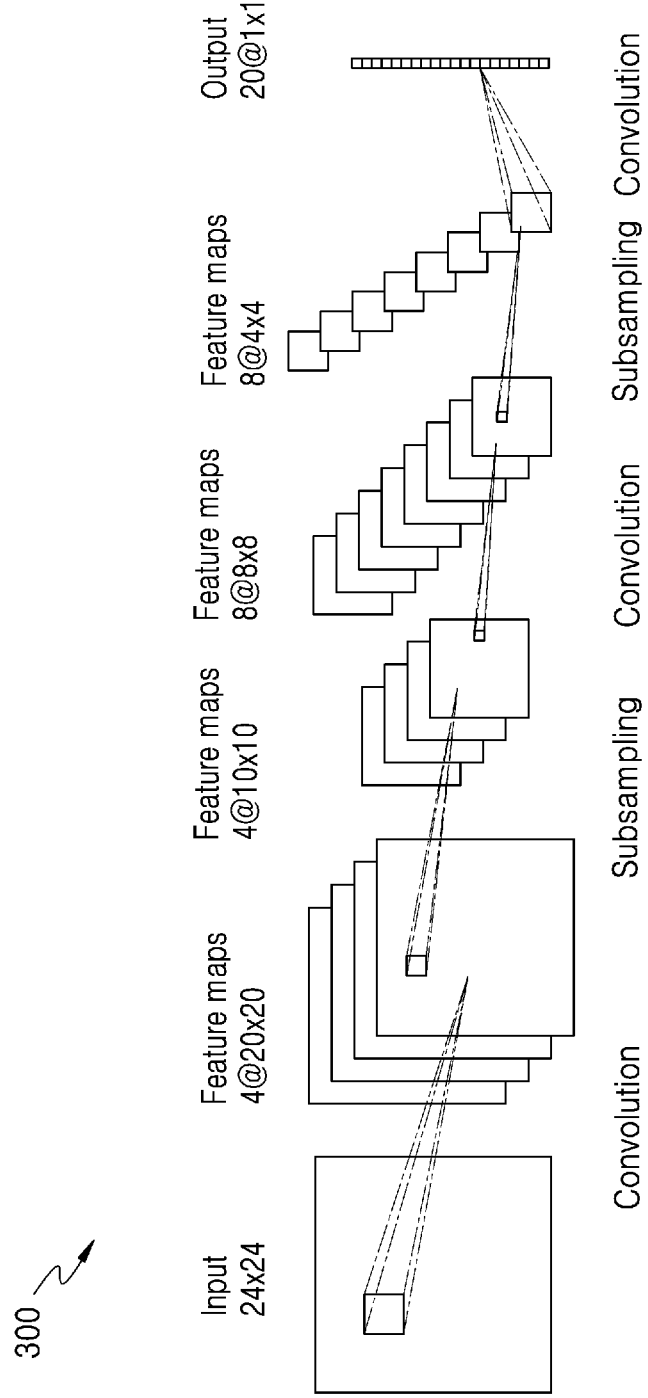
FIG. 3 is a diagram for describing a structure of a neural network.

FIG. 3 is a diagram for describing a general structure of a neural network 300.

The neural network 300 may have an architecture of a deep neural network (DNN) or an n-layer neural network. The DNN or the n-layer neural network may correspond to a CNN, a recurrent neural network (RNN), a deep belief network, a restricted Boltzman machine, or the like. For example, the neural network 300 may be implemented by a CNN, but is not limited thereto. The CNN corresponding to an example of the neural network 300 of FIG. 3 may further include a subsampling layer, a pooling layer, a fully connected layer, or the like, in addition to a convolution layer.

The neural network 300 may be implemented by an architecture having a plurality of layers including an input image, feature maps, and an output. In the neural network 300, a convolution operation of the input image is performed with a filter called a weight or a kernel, thereby outputting feature maps. A convolution operation of these generated output feature maps as input feature maps with a kernel filter is performed again, thereby outputting new feature maps. As a result of repetitively performing such a convolution operation, a recognition result of features of the input image through the neural network 300 may be finally output.

For example, when an image of a pixel size of 24×24 is input to the neural network 300 in FIG. 3, four-channel feature maps of a size of 20×20 may be output through a convolution operation of the input image with a kernel filter.

In addition, four-channel feature maps of a size of 10×10 may be output through a subsampling process by using only some of pixel values of the four-channel feature maps of the size of 20×20. A subsampling scheme may include a max-pooling scheme, an average-pooling scheme, or the like.

Thereafter, the size of the 10×10 feature maps may be reduced through repetitive convolution operations with a weight and a subsampling operation, thereby finally outputting global features. The neural network 300 may filter and output robust features generally representing an image from an input image by repetitively performing a convolution operation and a subsampling (or pooling) operation at several layers. A recognition result of the input image may be finally derived by inputting the output global features into a fully connected layer.

An input feature map and an output feature map in FIG. 3 may be respectively the input channel data and the output channel data described with reference to FIGS. 1, 2, 4, 5A to 5C, and 6 to 8.

Figure 4:
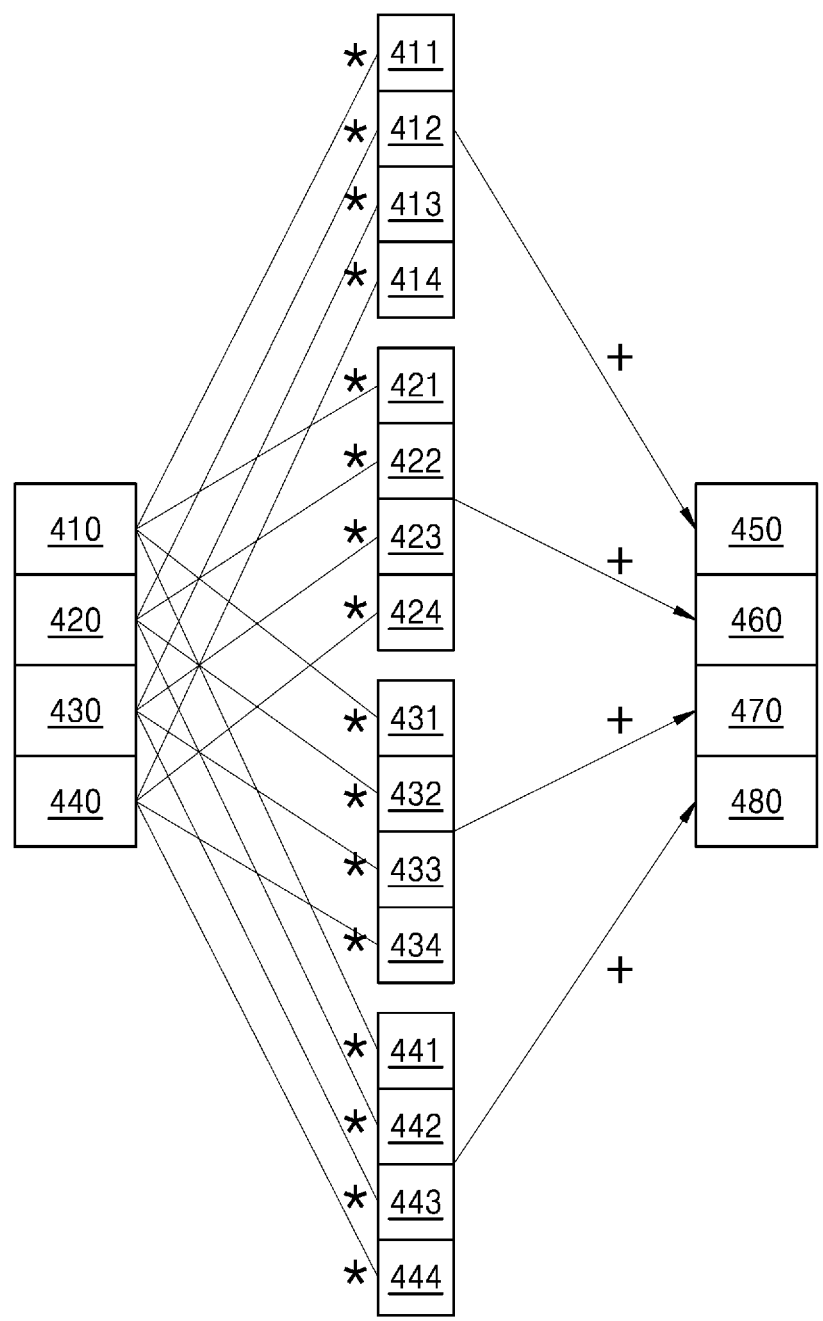
FIG. 4 is a diagram for describing a related art convolution operation.

FIG. 4 is a diagram for describing a related art convolution operation.

Referring to FIG. 4, to obtain M pieces of output channel data with respect to N pieces of input channel data, M×N kernel filters are necessary. For example, to obtain four pieces of, for example, first to fourth output channel data 450, 460, 470, and 480 with respect to four pieces of input channel data 410, 420, 430, and 440, 4×4 (i.e., 16) kernel filters are necessary. In addition, when a width by a height of a kernel filter is W×H, M×N×W×H filter parameters are required for a convolution operation. For example, when four pieces of input channel data and four pieces of output channel data are acquired and a size of a kernel filter is 3×3, 4×4×3×3 (i.e., 144) filter parameters are required for a convolution operation. In particular, the first output channel data 450 may be obtained by performing a convolution operation of respectively convoluting the four pieces of input channel data 410, 420, 430, and 440 and kernel filters 411, 412, 413, and 414 and summing the convolution results. The second output channel data 460 may be obtained by performing a convolution operation of respectively convoluting the four pieces of input channel data 410, 420, 430, and 440 and kernel filters 421, 422, 423, and 424 and summing the convolution results. The third output channel data 470 may be obtained by performing a convolution operation of respectively convoluting the four pieces of input channel data 410, 420, 430, and 440 and kernel filters 431, 432, 433, and 434 and summing the convolution results. The fourth output channel data 480 may be obtained by performing a convolution operation of respectively convoluting the four pieces of input channel data 410, 420, 430, and 440 and kernel filters 441, 442, 443, and 444 and summing the convolution results.

The number of parameters obtained by the convolution operation of FIG. 4 is determined by mathematical formula 2 below.

$$\text{param\_num} = \text{in\_ch} * \text{kernel\_}W * \text{kernel\_}H * \text{out\_ch}$$
[Mathematical formula 2]

Here, param_num denotes the number of parameters, in_ch denotes the number of pieces of input channel data, kernel_W denotes a width of a kernel filter, kernel_H denotes a height of a kernel filter, and out_ch denotes the number of pieces of output channel data.

Figure 5A:
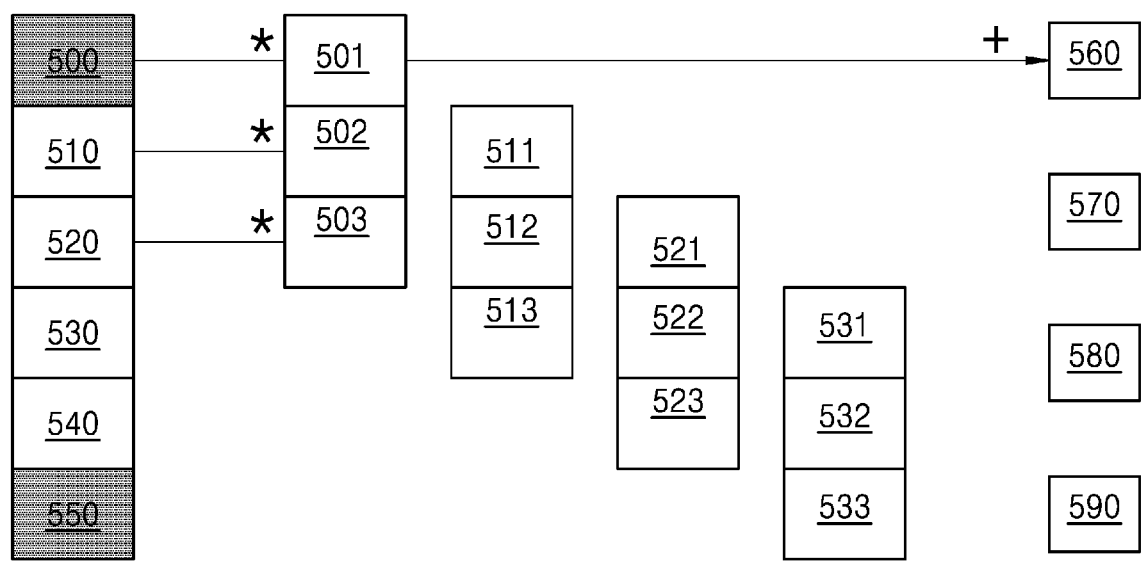
FIGS. 5A to 5C illustrate a method of performing, by an electronic device, a convolution operation at a certain layer in a neural network, according to an embodiment.
Figure 5B:
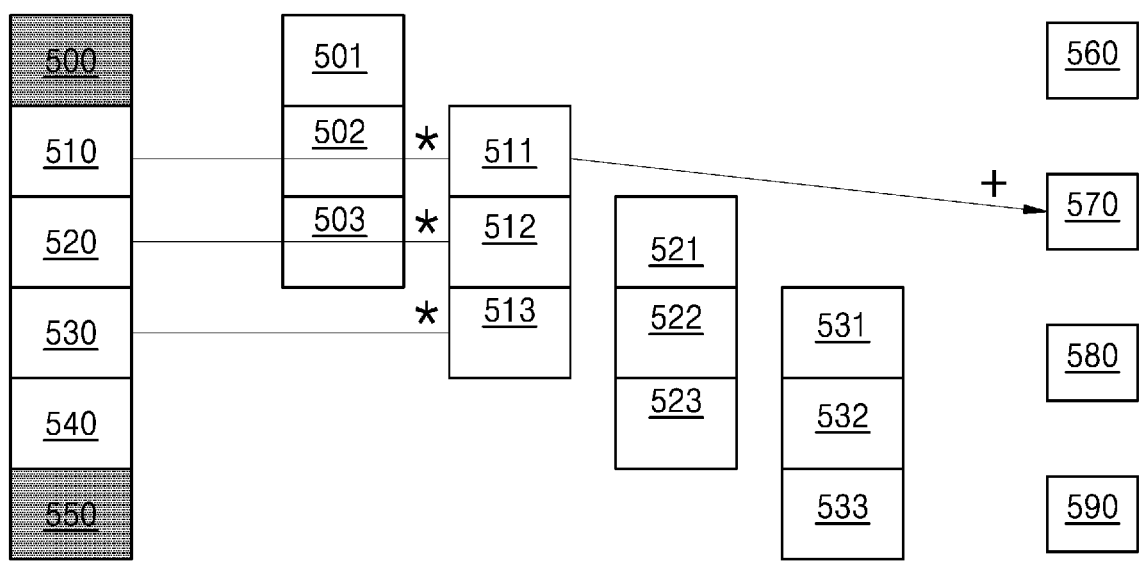
Figure 5C:
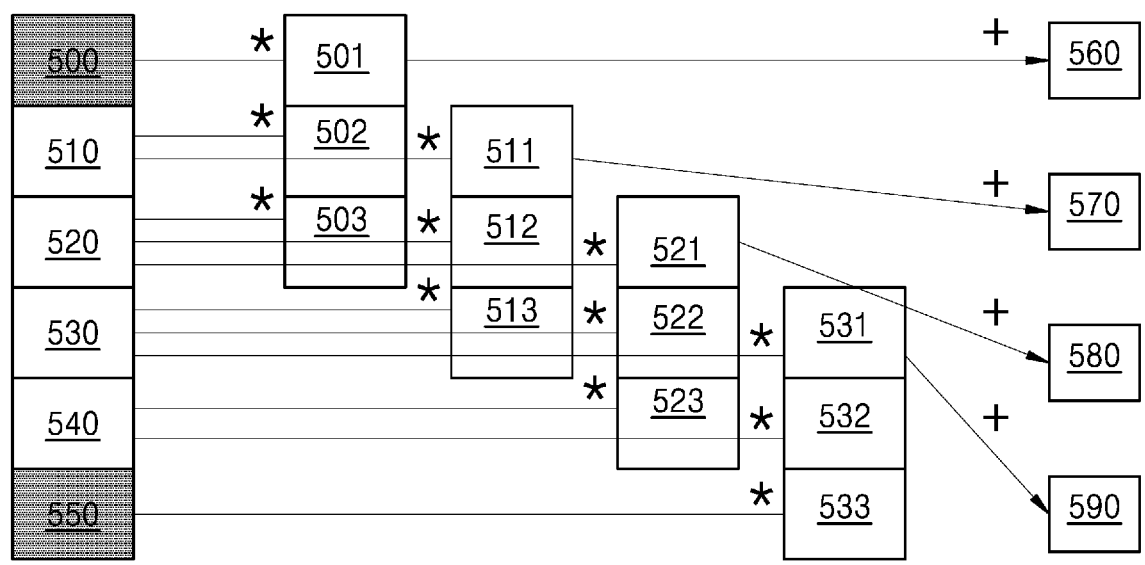

FIGS. 5A to 5C illustrate a method of performing a convolution operation at a certain layer in a neural network, according to an embodiment.

Referring to FIGS. 5A to 5C, a convolution operation may be performed a plurality of times by applying an input channel data group including K pieces of input channel data selected from N pieces of input channel data to a kernel filter group including K kernel filters, thereby obtaining output channel data. Compared with the convolution operation according to the related art of FIG. 4, a lower number of kernel filters and a lower number of kernel filter parameters are used. Accordingly, the efficiency of a low-performance device may be improved while reducing a computation amount of a neural network. By way of example, the electronic device 100 may be a device for performing object recognition (e.g., identifying an object in an image, facial recognition, etc.), a device for performing biometric sensing or recognition, a device for performing voice recognition, etc. By implementing the method of performing the convolution operation according to one or more embodiments, the electronic device 100 may provide an increased efficiency and/or processing speed, while reducing a computation amount for performing its corresponding operation (e.g., object recognition, voice recognition, etc.).

A process of obtaining four pieces (e.g., first to fourth) of output channel data 560, 570, 580, and 590 with respect to four pieces of input channel data 510, 520, 530, and 540, according to an embodiment, is particularly described with reference to FIGS. 5A to 5C.

According to an embodiment, 2P pieces of padding data may be generated by a preset padding parameter P, based on M pieces of input channel data. Accordingly, M+2P pieces of new input channel data may be obtained. The M pieces of input channel data may be output channel data output as a result of a convolution operation at a previous layer. For example, when a pre-set padding parameter p is 1, 2p (i.e., two pieces of) padding data 500 and 550 may be obtained, based on the four pieces of input channel data 510, 520, 530, and 540. Accordingly, six new pieces of input channel data 500, 510, 520, 530, 540, and 550 including the four pieces of input channel data 510, 520, 530, and 540 and the two pieces of padding data 500 and 550 may be obtained.

Referring to FIG. 5A, a convolution operation of respectively convoluting three pieces of first input channel data 500, 510, and 520 selected from the six pieces of input channel data 500, 510, 520, 530, 540, and 550 and three pieces of first kernel filters 501, 502, and 503 and summing the convolution results may be performed by applying a first input channel data group including the three pieces of first input channel data 500, 510, and 520 to a first kernel filter group including the three first kernel filters 501, 502, and 503, thereby obtaining the first output channel data 560.

Referring to FIG. 5B, a convolution operation of respectively convoluting three pieces of second input channel data 510, 520, and 520 selected from the six pieces of input channel data 500, 510, 520, 530, 540, and 550 and three second kernel filters 511, 512, and 513 and summing the convolution results may be performed by applying a second input channel data group including the three pieces of second input channel data 510, 520, and 520 to a second kernel filter group including the three second kernel filters 511, 512, and 513, thereby obtaining the second output channel data 570.

Referring to FIG. 5C, a convolution operation of three pieces of third input channel data 520, 530, and 540 selected from the six pieces of input channel data 500, 510, 520, 530, 540, and 550 and three third kernel filters 521, 522, and 523 may be performed by applying a third input channel data group including the three pieces of third input channel data 520, 530, and 540 to a third kernel filter group including the three third kernel filters 521, 522, and 523, thereby obtaining the third output channel data 580. A convolution operation of three pieces of fourth input channel data 530, 540, and 550 selected from the six pieces of input channel data 500, 510, 520, 530, 540, and 550 and three fourth kernel filters 531, 532, and 533 may be performed by applying a fourth input channel data group including the three pieces of fourth input channel data 530, 540, and 550 to a fourth kernel filter group including the three fourth kernel filters 531, 532, and 533, thereby obtaining the fourth output channel data 590.

While 16 kernel filters are required for the same input channel data and the same output channel data in FIG. 4, 12 kernel filters are used in the embodiment of FIGS. 5A to 5C. As a result, processing efficiency and speed is improved in the electronic device 100.

The number of kernel filters required or used by the method of performing a convolution operation at a certain layer in a neural network, according to an embodiment, is a product of the number of K kernel filters included in a plurality of kernel filter groups and the number of pieces of output channel data. Based on mathematical formula 1, the required or used number of kernel filters is represented by mathematical formula 3 below.

$$\text{kernelfilter\_num} = \text{kernel\_num} * ((\text{in\_ch} - \text{kernel\_num} + 2*\text{pad})/\text{ch\_stride} + 1) \quad \text{[Mathematical formula 3]}$$

Here, kernelfilter_num denotes the total number of kernel filters used for a convolution operation, in_ch denotes the number of pieces of input channel data, kernel_num denotes the number of pieces of input channel data of an input channel data group applied to a kernel filter group, 2*pad denotes the number of pieces of padding data, and ch_stride denotes an index interval of the input channel data to which the kernel filter group is applied.

The number of parameters obtained by the method of performing a convolution operation at a certain layer in a neural network, according to an embodiment, is determined by mathematical formula 4 below.

$$\text{param\_num} = \text{ch\_kernel} * \text{kernel\_W} * \text{kernel\_H} * ((\text{in\_ch} - \text{kernel\_num} + 2*\text{pad})/\text{ch\_stride} + 1) \quad \text{[Mathematical formula 4]}$$

Here, param_num denotes the number of parameters, ch_kernel denotes the number of kernel filters included in a kernel filter group applied to an input channel data group, kernel_W denotes a width of the kernel filter, kernel_H denotes a height of the kernel filter, in_ch denotes the number of pieces of input channel data, kernel_num denotes the number of pieces of input channel data of the input channel data group applied to the kernel filter group, 2*pad denotes the number of pieces of padding data, and ch_stride denotes an index interval of the input channel data to which the kernel filter group is applied.

When mathematical formula 4 is applied to the embodiment of FIG. 5C by assuming that a size of a kernel filter is 3×3, the number of parameters is 108. The number, 108, is less than the number, 144, of parameters calculated by assuming that a size of a kernel filter is 3×3 in FIG. 4.

The pieces of input channel data 500, 510, 520, 530, 540, and 550 of FIG. 5C may have indices. In particular, the pieces of input channel data 500, 510, 520, 530, 540, and 550 may have indices of 0 to 5. In the embodiment of FIG. 5C, the indices of the pieces of padding data 500 and 550 among the pieces of input channel data 500, 510, 520, 530, 540, and 550 are 0 and 5.

According to an embodiment, pieces of padding data may be copied from pieces of input channel data to be the same as a portion selected from output channel data computed at a previous layer of a certain layer. In particular, the padding data 500 having the index of 0 may be the same as the input channel data 540 having the index of 4, and the padding data 550 having the index of 5 may be the same as the input channel data 510 having the index of 1. Alternatively, the padding data 500 having the index of 0 may be the same as the input channel data 540 having the index of 1, and the padding data 550 having the index of 5 may be the same as the input channel data 510 having the index of 4.

Further, when (or based on) M pieces of channel data, which are pieces of output channel data computed at a previous layer, and 2P pieces of padding data are new pieces of input channel data, the pieces of input channel data may have indices of 0 to M+2P−1. In this case, when (or based on) N=M+2P−1, indices of pieces of padding data among the pieces of input channel data may be 0 to P−1 and N−P to N−1.

The pieces of padding data having indices of 0 to P−1 may be the same as pieces of input channel data having indices of N−2P to N−P−1, respectively, and the pieces of padding data having indices of N−P to N−1 may be the same as pieces of input channel data having indices of P to 2P−1, respectively. Alternatively, the pieces of padding data having the indices of 0 to P−1 may be the same as the pieces of input channel data having the indices of P to 2P−1, respectively, and the pieces of padding data having indices of N−P to N−1 may be the same as the pieces of input channel data having the indices of N−2P to N−P−1, respectively. Alternatively, all the pieces of padding data having the indices of 0 to P−1 may be the same as input channel data having the index of P, and the pieces of padding data having indices of N−P to N−1 may be the same as the input channel data having the index of N−P−1. The pieces of padding data may be set to a preset default value.

Figure 6:
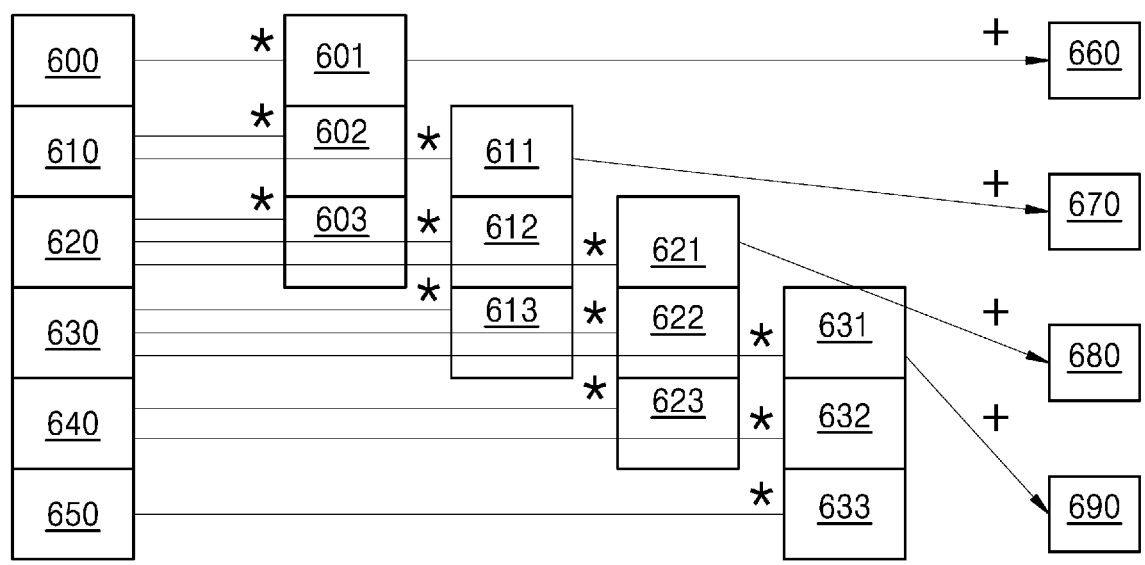
FIG. 6 illustrates a method of performing, by an electronic device, a convolution operation at a certain layer in a neural network, according to another embodiment.

FIG. 6 illustrates a method of performing a convolution operation at a certain layer in a neural network, according to another embodiment.

With reference to FIG. 6, a process of obtaining four pieces (e.g., first to fourth) of output channel data 660, 670, 680, and 690 with respect to six pieces of input channel data 600, 610, 620, 630, 640, and 650, according to an embodiment, is described in detail. In particular, a process of performing a convolution operation with input channel data and without padding data obtained by copying a portion of the input channel data, unlike in FIGS. 5A to 5C, is described.

According to the convolution operation according to the related art of FIG. 4, 4×6 (i.e., 24) kernel filters are required or used to obtain four pieces of output channel data with respect to six pieces of input channel data. In FIG. 6, however, 12 kernel filters may be required or used as described below, thereby reducing a computation amount.

A convolution process of FIG. 6 is the same as or similar to the convolution process of FIGS. 5A to 5C except for the existence (or lack thereof) of padding data. In particular, a convolution operation of respectively convoluting three pieces of first input channel data 600, 610, and 620 selected from the six pieces of input channel data 600, 610, 620, 630, 640, and 650 and three first kernel filters 601, 602, and 603 and summing the convolution results may be performed by applying a first input channel data group including the three pieces of first input channel data 600, 610, and 620 to a first kernel filter group including the three first kernel filters 601, 602, and 603, thereby obtaining the first output channel data 660. A convolution operation of respectively convoluting three pieces of second input channel data 610, 620, and 630 selected from the six pieces of input channel data 600, 610, 620, 630, 640, and 650 and three second kernel filters 611, 612, and 613 and summing the convolution results may be performed by applying a second input channel data group including the three pieces of second input channel data 610, 620, and 630 to a second kernel filter group including the three second kernel filters 611, 612, and 613, thereby obtaining the second output channel data 670. A convolution operation of respectively convoluting three pieces of third input channel data 620, 630, and 640 selected from the six pieces of input channel data 600, 610, 620, 630, 640, and 650 and three third kernel filters 621, 622, and 623 and summing the convolution results may be performed by applying a third input channel data group including the three pieces of third input channel data 620, 630, and 640 to a third kernel filter group including the three third kernel filters 621, 622, and 623, thereby obtaining the third output channel data 680. A convolution operation of respectively convoluting three fourth pieces of input channel data 630, 640, and 650 selected from the six pieces of input channel data 600, 610, 620, 630, 640, and 650 and three fourth kernel filters 631, 632, and 633 and summing the convolution results may be performed by applying a fourth input channel data group including the three pieces of fourth input channel data 630, 640, and 650 to a fourth kernel filter group including the three fourth kernel filters 631, 632, and 633, thereby obtaining the fourth output channel data 690.

FIGS. 5A to 5C and 6 are embodiments in which a channel stride is assumed as 1.

Referring to FIGS. 5A to 5C and 6, because a channel stride S (e.g., S=1) is less than the number K (e.g., K=3) of kernel filters in a kernel filter group applied to an input channel data group, input channel data included in the input channel data group may be applied to each of kernel filters of different kernel filter groups, thereby affecting the obtaining of different pieces of output channel data through a convolution operation. Therefore, because input channel data affects determining different pieces of output channel data, and an input channel data group including a plurality of pieces of input channel data is applied to a kernel filter group to determine output channel data, the plurality of pieces of input channel data and a plurality of pieces of output channel data affect each other.

Figure 7:
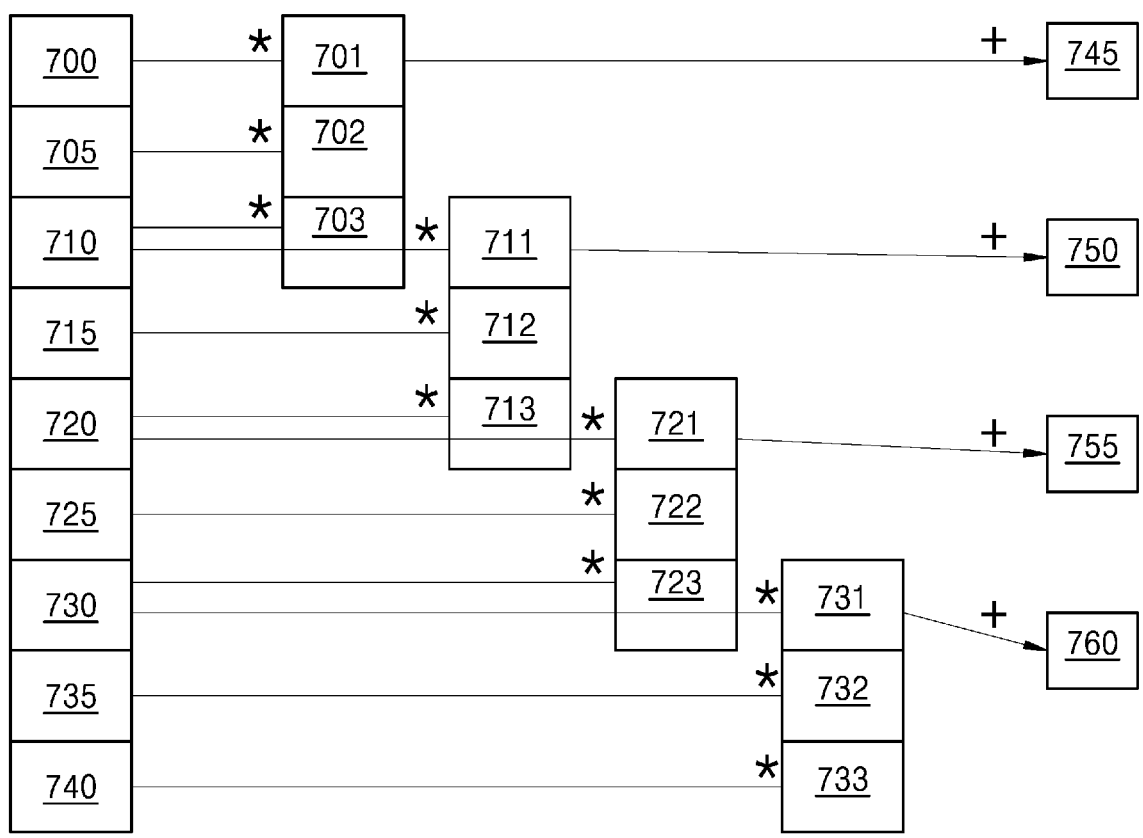
FIG. 7 illustrates a method of performing, by an electronic device, a convolution operation at a certain layer in a neural network, according to another embodiment.

FIG. 7 illustrates a method of performing a convolution operation at a certain layer in a neural network, according to another embodiment.

FIG. 7 illustrates an example in which a channel stride is 2.

Referring to FIG. 7, a process of obtaining four pieces (e.g., first to fourth) of output channel data 745, 750, 755, and 760 with respect to nine pieces of input channel data 700, 705, 710, 715, 720, 725, 730, 735, and 740 is described in detail.

In particular, a convolution operation of respectively convoluting three pieces of first input channel data 700, 705, and 710 selected from the nine pieces of input channel data 700, 705, 710, 715, 720, 725, 730, 735, and 740 and three first kernel filters 701, 702, and 703 and summing the convolution results may be performed by applying a first input channel data group including the three pieces of first input channel data 700, 705, and 710 to a first kernel filter group including the three first kernel filters 701, 702, and 703, thereby obtaining the first output channel data 745. A convolution operation of respectively convoluting three pieces of second input channel data 710, 715, and 720 selected from the nine pieces of input channel data 700, 705, 710, 715, 720, 725, 730, 735, and 740 and three second kernel filters 711, 712, and 713 and summing the convolution results may be performed by applying a second input channel data group including the three pieces of second input channel data 710, 715, and 720 to a second kernel filter group including the three second kernel filters 711, 712, and 713, thereby obtaining the second output channel data 750. Herein, a size of an interval between the selected pieces of second input channel data 710, 715, and 720 and the pieces of first input channel data 700, 705, and 710 may be S, which is a size of the channel stride. Likewise, a convolution operation of respectively convoluting three pieces of third input channel data 720, 725, and 730 selected from the nine pieces of input channel data 700, 705, 710, 715, 720, 725, 730, 735, and 740 and three third kernel filters 721, 722, and 723 and summing the convolution results may be performed by applying a third input channel data group including the three pieces of first input channel data 720, 725, and 730 to a third kernel filter group including the three third kernel filters 721, 722, and 723, thereby obtaining the third output channel data 755. A convolution operation of respectively convoluting three pieces of fourth input channel data 730, 735, and 740 selected from the nine pieces of input channel data 700, 705, 710, 715, 720, 725, 730, 735, and 740 and three fourth kernel filters 731, 732, and 733 and summing the convolution results may be performed by applying a fourth input channel data group including the three pieces of fourth input channel data 731, 732, and 733 to a fourth kernel filter group including the three fourth kernel filters 731, 732, and 733, thereby obtaining the fourth output channel data 760.

In FIG. 7, while 36 kernel filters corresponding to a product of 9, which is the number of pieces of input channel data, and 4, which is the number of pieces of output channel data, are required to perform a convolution operation by the convolution operation method according to the related art of FIG. 4, only 12 kernel filters are required or used to perform a convolution operation according to the embodiment of the disclosure of FIG. 7.

In addition, assuming that a size of a kernel filter is 3×3, while 324 parameters are required to perform a convolution operation by the convolution operation method according to the related art of FIG. 4, only 108 parameters are required or used to perform a convolution operation according to the embodiment of the disclosure of FIG. 7.

Figure 8:
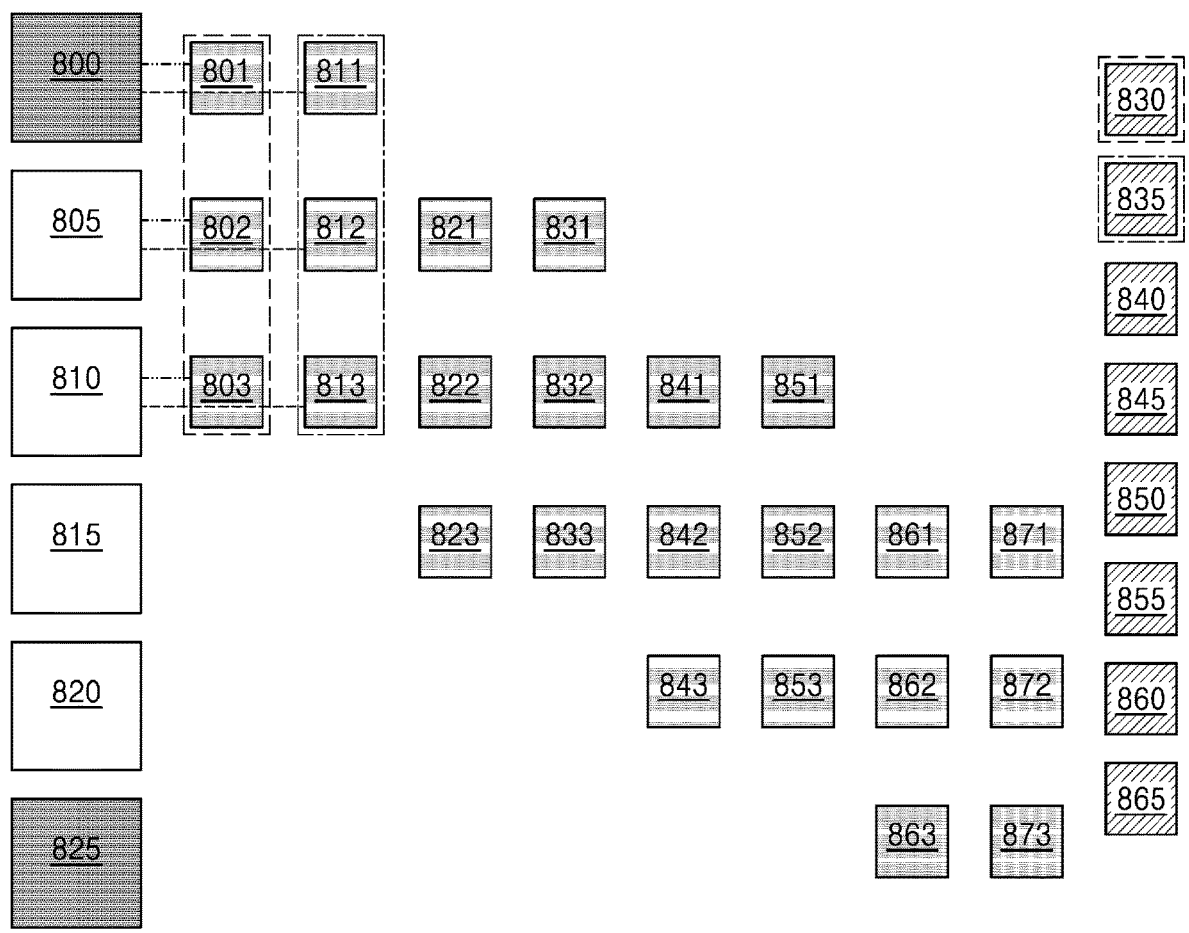
FIG. 8 illustrates a method of performing, by an electronic device, a convolution operation at a certain layer in a neural network, according to another embodiment.

FIG. 8 illustrates a method of performing a convolution operation at a certain layer in a neural network, according to another embodiment.

Referring to FIG. 8, a process of obtaining eight pieces (e.g., first to eighth) of output channel data 830, 835, 840, 845, 850, 855, 860, and 860 with respect to new input channel data including four pieces of input channel data 805, 810, 815, and 820 and two pieces of padding data 800 and 825 when a channel stride is 1 is described in detail.

A convolution operation of three pieces of first input channel data 800, 805, and 810 selected from the six pieces of input channel data 800, 805, 810, 815, 820, and 825 and three first kernel filters 801, 802, and 803 may be performed by applying a first input channel data group including the three pieces of first input channel data 800, 805, and 810 to a first kernel filter group including the three first kernel filters 801, 802, and 803, thereby obtaining the first output channel data 830. A convolution operation of the pieces of first input channel data 800, 805, and 810 and three pieces of second kernel filters 811, 812, and 813 may be performed by applying the first input channel data group to a second kernel filter group including the three second kernel filters 811, 812, and 813, thereby obtaining the second output channel data 835. Likewise, a convolution operation of three pieces of second input channel data 805, 810, and 815 selected from the six pieces of input channel data 800, 805, 810, 815, 820, and 825 and three third kernel filters 821, 822, and 823 may be performed by applying a second input channel data group including the three pieces of second input channel data 805, 810, and 815 to a third kernel filter group including the three third kernel filters 821, 822, and 823, thereby obtaining the third output channel data 840. A convolution operation of the pieces of second input channel data 805, 810, and 815 selected from the six pieces of input channel data 800, 805, 810, 815, 820, and 825 and three fourth kernel filters 831, 832, and 833 may be performed by applying the second input channel data group including the three pieces of second input channel data 805, 810, and 815 to a fourth kernel filter group including the three fourth kernel filters 831, 832, and 833, thereby obtaining the fourth output channel data 845. A convolution operation of three pieces of third input channel data 810, 815, and 820 selected from the six pieces of input channel data 800, 805, 810, 815, 820, and 825 and three fifth kernel filters 841, 842, and 843 may be performed by applying a third input channel data group including the three pieces of third input channel data 810, 815, and 820 to a fifth kernel filter group including the three fifth kernel filters 841, 842, and 843, thereby obtaining the fifth output channel data 850. A convolution operation of the pieces of third input channel data 810, 815, and 820 selected from the six pieces of input channel data 800, 805, 810, 815, 820, and 825 and three sixth kernel filters 851, 852, and 853 may be performed by applying the third input channel data group including the three pieces of third input channel data 810, 815, and 820 to a sixth kernel filter group including the three sixth kernel filters 851, 852, and 853, thereby obtaining the sixth output channel data 855. A convolution operation of three pieces of fourth input channel data 815, 820, and 825 selected from the six pieces of input channel data 800, 805, 810, 815, 820, and 825 and three seventh kernel filters 861, 862, and 863 may be performed by applying a fourth input channel data group including the three pieces of fourth input channel data 815, 820, and 825 to a seventh kernel filter group including the three seventh kernel filters 861, 862, and 863, thereby obtaining the seventh output channel data 860. A convolution operation of the pieces of fourth input channel data 815, 820, and 825 selected from the six pieces of input channel data 800, 805, 810, 815, 820, and 825 and three eighth kernel filters 871, 872, and 873 may be performed by applying the fourth input channel data group including the three pieces of fourth input channel data 815, 820, and 825 to an eighth kernel filter group including the three eighth kernel filters 871, 872, and 873, thereby obtaining the eighth output channel data 865.

In FIG. 8, while 32 kernel filters corresponding to a product of 4, which is the number of pieces input channel data, and 8, which is the number of pieces of output channel data, are required to perform a convolution operation by the convolution operation method according to the related art of FIG. 4, only 24 kernel filters are required or used to perform a convolution operation according to the embodiment of the disclosure of FIG. 8.

In FIG. 8, when a plurality of kernel filter groups instead of one kernel filter group are applied to an input channel data group to obtain output channel data, the number of obtained parameters is determined by mathematical formula 5 below.

$$\text{param\_num} = \text{ch\_kernel} * \text{kernel\_}W * \text{kernel\_}H * L *$$
$$((\text{in\_ch} - \text{kernel\_num} + 2*\text{pad})/\text{ch\_stride} + 1)$$
[Mathematical formula 5]

Here, param_num denotes the number of parameters, ch_kernel denotes the number of kernel filters included in a kernel filter group applied to an input channel data group, kernel_W denotes a width of the kernel filter, kernel_H denotes a height of the kernel filter, in_ch denotes the number of pieces of input channel data, kernel_num denotes the number of pieces of input channel data of the input channel data group applied to the kernel filter group, 2*pad denotes the number of pieces of padding data, ch_stride denotes an index interval of the input channel data to which the kernel filter group is applied, and L denotes the number of kernel filter groups applied to the input channel data group.

For example, when mathematical formula 5 is applied to the embodiment of FIG. 8 by assuming that a size of a kernel filter is 3×3, the number of parameters is 216. This number is less than 288, which is the number of parameters obtained through the convolution operation according to the related art of FIG. 4.

Figure 9:
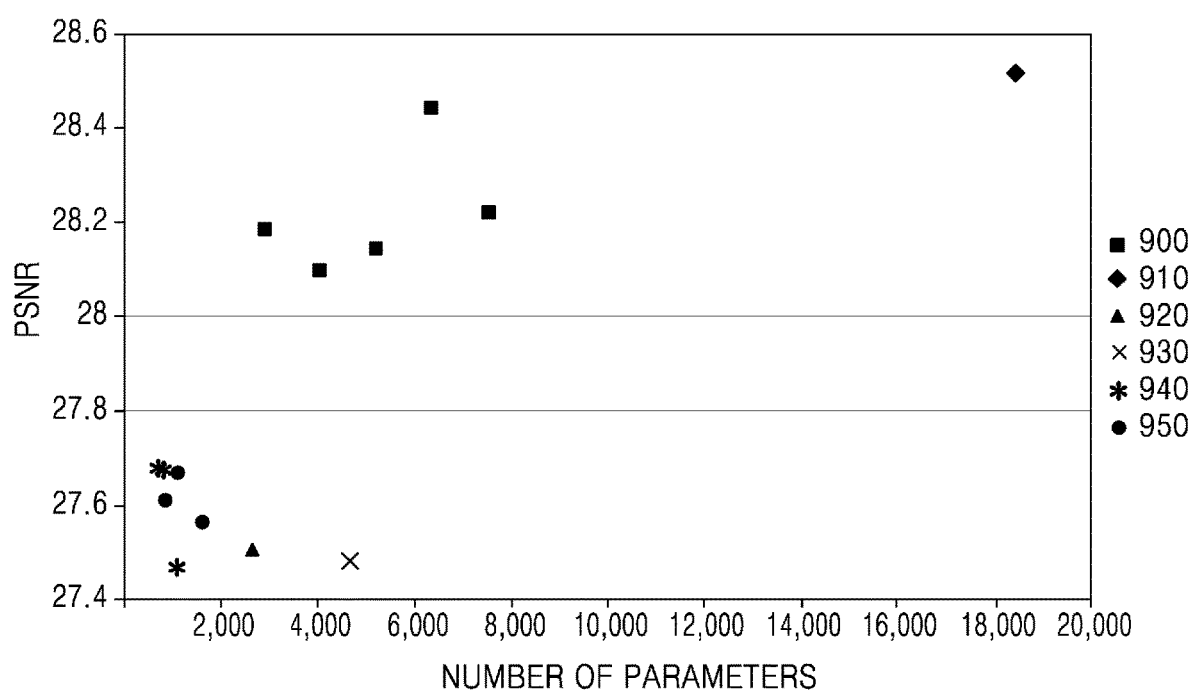
FIG. 9 is a graph comparing performances of the related art and of a method of performing, by an electronic device, a convolution operation at a certain layer in a neural network, according to an embodiment.

FIG. 9 is a graph comparing performances of the related art and of a method of performing, by an electronic device, a convolution operation at a certain layer in a neural network, according to an embodiment.

A diamond mark 910 indicates an application result of the related art, a triangle mark 920 and an x mark 930 indicate application results of MobileNet, and a star mark 940 and a circle mark 950 indicate application results of ShuffleNet. A square mark 900 indicates an application result of a method of performing, by an electronic device, a convolution operation at a certain layer in a neural network, according to an embodiment. Referring to FIG. 9, the method of performing a convolution operation at a certain layer in a neural network may hardly have a decrease in the performance and have approximately one third the number of parameters (a computation amount of multiplication and addition) as compared to the convolution operation according to the related art as shown in FIG. 6, and may have an improved peak signal to noise ratio (PSNR) by 1 dB or more in the same computation amount as compared to MobileNet and ShuffleNet, which are research results for reducing a computation amount.

In addition, the operations of the processor 120 in the electronic device 100 of FIG. 1 for performing a convolution operation at a certain layer in a neural network may be implemented by a software module. When the processor 120 is implemented by a software module (or a program module including instructions), the software module may be stored in a non-transitory computer-readable recording medium. In this case, at least one software module may be provided by an operating system (OS) or a certain application. Alternatively, a portion of the at least one software module may be provided by the OS, and the other portion may be provided by the certain application.

Each component of a block diagram may be integrated, added, or omitted according to the specification of the electronic device 100 actually implemented. That is, in accordance with circumstances, two or more components may be integrated into one component, or one component may be divided into two or more components. In addition, a function performed by each block is to describe embodiments of the disclosure, and a particular operation or device thereof does not limit the scope of the disclosure.

The method of performing, by the electronic device 100, a convolution operation at a certain layer in a neural network may be implemented in a form of program commands executable by various computer means and recorded on a non-transitory computer-readable recording medium. The non-transitory computer-readable recording medium may include program commands, data files, data structures, and the like, taken alone or in combination. The program commands recorded on the non-transitory computer-readable recording medium may be specially designed and constructed for the disclosure or may be known to and usable by one of ordinary skill in a field of computer software. Examples of the non-transitory computer-readable recording medium include magnetic media, e.g., hard discs, floppy discs, or magnetic tapes, optical media, e.g., compact disc-read only memories (CD-ROMs), or digital versatile discs (DVDs), magneto-optical media, e.g., floptical discs, and hardware devices that are specially configured to store and carry out program commands, e.g., ROMs, RAMs, or flash memories. Examples of the program commands include a high-level language code that may be executed by a computer using an interpreter as well as a machine language code made by a complier.

In addition, a method of performing a convolution operation at a certain layer in a neural network, and an electronic device therefor, according to the embodiments of the disclosure, may be provided by being included in a computer program product. The computer program product may be traded between a seller and a purchaser.

The computer program product may include a software (S/W) program, a non-transitory computer-readable storage medium in which the S/W program is stored. For example, the computer program product may include a S/W program form of product (e.g., a downloadable application) electronically distributed through a manufacturing company of the electronic device or an electronic market. For the electronic distribution, at least a portion of the S/W program may be stored in a storage medium or temporarily generated. In this case, the storage medium may be included in a server of the manufacturing company, a server of the electronic market, or a relay server configured to temporarily store the S/W program.

The computer program product may include a storage medium of a server or a storage medium of a client device in a system including the server and the client device. Alternatively, when a third device (e.g., a smartphone) connected to the server or the client device through communication exists, the computer program product may include a storage medium of the third device. Further, the computer program product may include the S/W program to be transmitted from the server to the client device or the third device or transmitted from the third device to the client device.

In this case, one of the server, the client device, and the third device may execute the computer program product and perform the methods according to the embodiments of the disclosure. Alternatively, two or more of the server, the client device, and the third device may execute the computer program product and perform the methods according to the embodiments of the disclosure in a distributed fashion.

A method of performing, by an electronic device, a convolution operation at a certain layer in a neural network, according to an embodiment, may allow the electronic device to perform a convolution operation at a certain layer in a neural network by using a convolution operation of applying an input channel data group including K pieces of input channel data selected from N pieces of input channel data to a kernel filter group including K kernel filters, thereby reducing the number of kernel filter parameters and the number of kernel filters, resulting in reducing a computation amount and improving the performance of the device.

For example, a server (e.g., a cloud server or an artificial intelligence server) may execute a computer program product stored in the server to control a client device connected to the server through communication, wherein the client device performs the methods according to the disclosed embodiments of the disclosure.

While embodiments of the disclosure have been described in detail, the scope of the disclosure is not limited thereto, and various modified and improved forms of those of ordinary skill in the art using the basis concept of the disclosure defined at least in the claims also within the scope of the disclosure.

What is claimed is:

1. A method of performing, by an electronic device, a convolution operation at a certain layer in a neural network, the method comprising:
    obtaining N pieces of input channel data;
    performing, by the electronic device, a first convolution operation in the neural network by applying a first input channel data group including K pieces of first input channel data, from among the N pieces of input channel data, to a first kernel filter group including K first kernel filters;
    performing, by the electronic device, a second convolution operation in the neural network by applying a second input channel data group including K pieces of second input channel data, from among the N pieces of input channel data, to a second kernel filter group including K second kernel filters; and
    obtaining output channel data based on the first convolution operation and the second convolution operation,
    wherein N is a natural number and K is a natural number that is less than N,
    the N pieces of input channel data have indices from 0 to N−1;
    the first input channel data group includes the K pieces of first input channel data corresponding to indices from 0 to K−1;
    the second input channel data group includes the K pieces of second input channel data corresponding to indices from S to S+K−1, and
    S is determined by a preset channel stride,
    wherein the N pieces of input channel data comprise a preset number of pieces of padding data, and
    wherein the pieces of padding data are nonzero and the pieces of padding data are copied from the N pieces of input channel data so that each piece of padding data is the same as a piece of output channel data computed at a previous layer before the certain layer,
    wherein, among the N pieces of input channel data, pieces of input channel data corresponding to indices from 0 to P−1 and pieces of input channel data corresponding to indices from N−P to N−1 are the pieces of padding data, wherein P is a natural number,
    wherein, the pieces of input channel data corresponding to indices from 0 to P−1 are same as pieces of input channel data corresponding to indices from N−2P to N−P−1 and the pieces of input channel data corresponding to indices from N−P to N−1 are same as pieces of input channel data corresponding to indices from P to 2P−1.

2. The method of claim 1, wherein:
    the K pieces of first input channel data include pieces of input channel data respectively corresponding to the indices from 0 to K−1; and
    the K pieces of second input channel data include pieces of input channel data respectively corresponding to the indices from S to S+K−1.

3. The method of claim 1, wherein a number of pieces of output channel data is determined based on S and K.

4. The method of claim 1, wherein the N pieces of input channel data are based on image data processed by the electronic device.

5. The method of claim 1, wherein the convolution operation is performed in a convolutional neural network (CNN).

6. An electronic device for performing a convolution operation at a certain layer of a neural network, the electronic device comprising:
a memory storing one or more instructions; and
a processor configured to execute the one or more instructions stored in the memory to:
obtain N pieces of input channel data;
perform a first convolution operation in the neural network by applying a first input channel data group including K pieces of first input channel data, from among the N pieces of input channel data, to a first kernel filter group including K first kernel filters;
perform a second convolution operation in the neural network by applying a second input channel data group including K pieces of second input channel data, from among the N pieces of input channel data, to a second kernel filter group including K second kernel filters; and
obtain output channel data based on the first convolution operation and the second convolution operation,
wherein N is a natural number and K is a natural number that is less than N,
the N pieces of input channel data have indices from 0 to N−1,
the first input channel data group includes the K pieces of first input channel data corresponding to indices from 0 to K−1,
the second input channel data group includes the K pieces of second input channel data corresponding to indices from S to S+K−1, and
S is determined by a preset channel stride,
wherein the N pieces of input channel data comprise a preset number of pieces of padding data, and
wherein the pieces of padding data are nonzero and the pieces of padding data are copied from the N pieces of input channel data so that each piece of padding data is the same as a piece of output channel data computed at a previous layer before the certain layer,
wherein, among the N pieces of input channel data, pieces of input channel data corresponding to indices from 0 to P−1 and pieces of input channel data corresponding to indices from N−P to N−1 are the pieces of padding data, wherein P is a natural number,
wherein, the pieces of input channel data corresponding to indices from 0 to P−1 are same as pieces of input channel data corresponding to indices from N−2P to N−P−1 and the pieces of input channel data corresponding to indices from N−P to N−1 are same as pieces of input channel data corresponding to indices from P to 2P−1.

7. The electronic device of claim 6, wherein:
the K pieces of first input channel data include pieces of input channel data respectively corresponding to the indices from 0 to K−1; and
the K pieces of second input channel data include pieces of input channel data respectively corresponding to the indices from S to S+K−1.

8. The electronic device of claim 6, wherein a number of pieces of output channel data is determined based on S and K.

9. A non-transitory computer-readable recording medium having stored therein a program for executing, on an electronic device, a method of performing a convolution operation at a certain layer in a neural network, the method comprising:
obtaining N pieces of input channel data;
performing, by the electronic device, a first convolution operation in the neural network by applying a first input channel data group including K pieces of first input channel data, from among the N pieces of input channel data, to a first kernel filter group including K first kernel filters;
performing, by the electronic device, a second convolution operation in the neural network by applying a second input channel data group including K pieces of second input channel data, from among the N pieces of input channel data, to a second kernel filter group including K second kernel filters; and
obtaining output channel data based on the first convolution operation and the second convolution operation,
wherein N is a natural number and K is a natural number that is less than N,
the N pieces of input channel data have indices from 0 to N−1;
the first input channel data group includes the K pieces of first input channel data corresponding to indices from 0 to K−1;
the second input channel data group includes the K pieces of second input channel data corresponding to indices from S to S+K−1; and
S is determined by a preset channel stride,
wherein the N pieces of input channel data comprise a preset number of pieces of padding data, and
wherein the pieces of padding data are nonzero and the pieces of padding data are copied from the N pieces of input channel data so that each piece of padding data is the same as a piece of output channel data computed at a previous layer before the certain layer,
wherein, among the N pieces of input channel data, pieces of input channel data corresponding to indices from 0 to P−1 and pieces of input channel data corresponding to indices from N−P to N−1 are the pieces of padding data, wherein P is a natural number,
wherein, the pieces of input channel data corresponding to indices from 0 to P−1 are same as pieces of input channel data corresponding to indices from N−2P to N−P−1 and the pieces of input channel data corresponding to indices from N−P to N−1 are same as pieces of input channel data corresponding to indices from P to 2P−1.

* * * * *